Figure 1:

May 15, 1928.

J. BOREL 1,669,445

AUTOMOBILE HEAD LAMP

Filed Jan. 14, 1926

REISSUED

Patented May 15, 1928.

1,669,445

UNITED STATES PATENT OFFICE.

JOSEPH BOREL, OF ANNECY, FRANCE.

AUTOMOBILE HEAD LAMP.

Application filed January 14, 1926, Serial No. 81,302, and in France October 31, 1925.

The invention, hereinafter described, relates to lamps of that type adapted for attachment to power-driven vehicles for illuminating their sides and adjacent roadway, thereby enabling the drivers of other vehicles to pass with safety; the lamps being shaded in such manner that the rays emitted from the source of light do not rise to a height which would dazzle the drivers of other vehicles nor pedestrians.

Lamps of the type referred to are usually attached to the windscreen, the front mudguards, or other fixtures on the vehicle and are swivelled to enable them to be moved to direct the rays in direction other than downwardly.

The object of my invention is to provide a lamp of the type referred to which not only fulfills the purposes mentioned but is of such construction that it is capable of being moved in any direction, well away from its normal position when the vehicle is travelling, to enable it to be used as a most efficient inspection lamp which will enable repairs to be executed at night.

With the above object in view, the invention consists in the combination of a lamp having a suitable shade and specifically constructed and arranged parts of mechanism.

In the drawing:—

Figure 2:
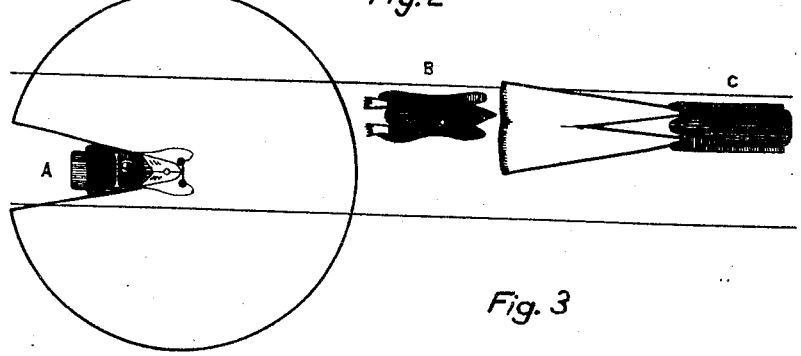
Figure 3:
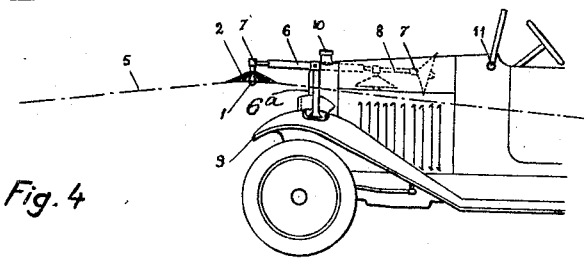
Figure 4:
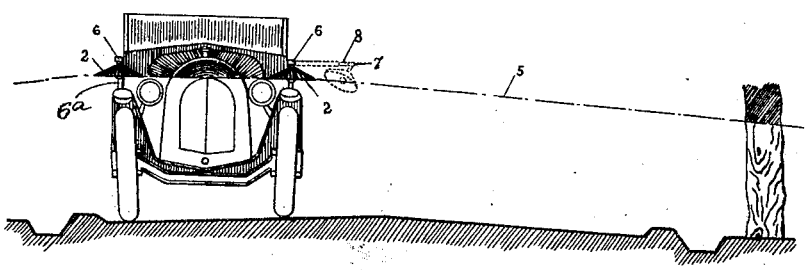
Figure 5:
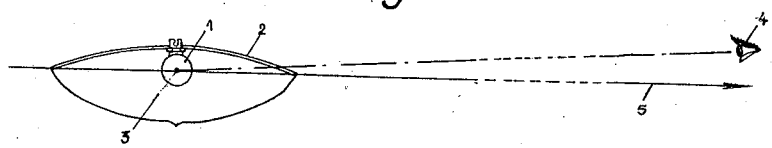

Figures 1 and 2 show an elevation and a plan, respectively, of an automobile equipped with lamps of the type to which my invention appertains, passing two others at night, the first marked A being provided with the device according to this invention, the driver of the second, marked B, having shut off his head lamp and keeping only his side lights burning while the driver of the third automobile marked C, has reduced the length of the beam of his head lamps. Fig. 3 shows a car fitted with the arrangement, in side elevation, the device being shown occupying three of the positions it can take up, the normal position being in full lines; Fig. 4 shows a front view of Fig. 3; Fig. 5 shows the projection of a beam of light, in relation to the eye of an observer, at normal height from the ground.

The arrangement comprises either one or two lamps 1 disposed in a vertical axis at the front of the car and having a shade or reflector 2. The lamps are disposed at such a height that the focus 3 is invisible to the eye of an oncoming driver or a person standing on the road and that all the rays of light are projected by the reflector 2 far afield and in all directions below the line 5. Moreover in view of the downward emission of light, no matter what the intensity of the light may be, it can never blind an oncoming driver.

The shaded lamps 1 are pivoted, at 7, to one section 8 of an arm 6, composed of telescopic sections, of which one is hinged to a pivot turnable in a support $6^a$ the connections being such that the lamp can be turned in almost any direction as shown, for instance, in Fig. 3. The lamps therefore for inspection purposes, for a repair at night or the changing of a tyre owing to the fact that they clearly illuminate the part where light is required. The support $6^a$ may be secured to the mudguards 9 or on the radiator cap 10 or at any other convenient part of the vehicle, as at 11.

I claim:

In a non-dazzle head lamp for road vehicles, in combination, a horizontal arm carried by the vehicle and projecting in front thereof, a lamp having its axis vertical suspended from said arm, a downwardly projecting reflector carried by said lamp, said vertical lamp being located within said downwardly projecting reflector and the arrangement being such that the luminous focus is in the exact horizontal plane of the lower edge of said reflector the rays of light being projected in a direct horizontal plane over a large circular zone of ground and pivotal means for supporting said lamp.

JOSEPH BOREL.